United States Patent
Fukuda

(10) Patent No.: US 7,170,878 B2
(45) Date of Patent: ***Jan. 30, 2007

(54) COMMUNICATION DEVICE AND COMMUNICATION METHOD

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 1080 days.

This patent is subject to a terminal disclaimer.

(21) Appl. No.: 09/980,865

(22) PCT Filed: Mar. 7, 2001

(86) PCT No.: PCT/JP01/01780

§ 371 (c)(1),
(2), (4) Date: Feb. 25, 2002

(87) PCT Pub. No.: WO01/67710

PCT Pub. Date: Sep. 13, 2001

(65) Prior Publication Data

US 2002/0159406 A1 Oct. 31, 2002

(30) Foreign Application Priority Data

Mar. 7, 2000 (JP) .............................. 2000-067211

(51) Int. Cl.
*H04Q 7/24* (2006.01)
*H04Q 7/00* (2006.01)
*H04J 3/16* (2006.01)
*H04J 3/22* (2006.01)

(52) U.S. Cl. ...................... 370/338; 370/466; 370/469; 370/328; 709/249; 709/250; 709/230

(58) Field of Classification Search ..................... None
See application file for complete search history.

(56) References Cited

U.S. PATENT DOCUMENTS

| | | | | |
|---|---|---|---|---|
| 5,805,834 | A * | 9/1998 | McKinley et al. | 710/302 |
| 6,272,120 | B1 * | 8/2001 | Alexander | 370/338 |
| 6,701,361 | B1 * | 3/2004 | Meier | 709/224 |
| 6,721,805 | B1 * | 4/2004 | Bhagwat et al. | 709/250 |
| 6,772,331 | B1 * | 8/2004 | Hind et al. | 713/151 |
| 6,914,897 | B1 * | 7/2005 | Schuster et al. | 370/352 |
| 6,930,987 | B1 * | 8/2005 | Fukuda et al. | 370/328 |
| 2001/0037397 | A1 * | 11/2001 | Boucher et al. | 709/230 |
| 2002/0034168 | A1 * | 3/2002 | Swartz et al. | 370/329 |
| 2004/0054799 | A1 * | 3/2004 | Meier et al. | 709/230 |

* cited by examiner

*Primary Examiner*—Chirag Shah
(74) *Attorney, Agent, or Firm*—Lerner, David, Littenberg, Krumholz & Mentlik, LLP

(57) ABSTRACT

A method and apparatus for performing data transfer to and from a host device via a radiocommunication network, and to and from a communication device connected to an external communication network outside the radiocommunication network via the radiocommunication network. Internally stored communication setting information on the external communication network is used to set a relation of connection to the external communication network via the communication device. The relation of connection with the external communication network is used to transfer data to and from the external communication network via the communication device and also to transfer data to and from the host device via the radiocommunication network for controlling data transfer between the host device and external communication network.

12 Claims, 7 Drawing Sheets

COMMUNICATION DEVICE AND COMMUNICATION METHOD

TECHNICAL FIELD

The present invention relates to a communication apparatus and method for making data communications with an external communication network by a short-range radiocommunication based on the Bluetooth system for example.

BACKGROUND ART

In the recent field of radiocommunication system, radiocommunication systems have been developed which adopt the "Bluetooth" (will be referred to as "BT" hereunder) system for data transfer between communication hopping of a radio wave included in a 2.4 GHz band.

The "BT" is a code name of a new industrial standard for implementation of radiocommunication between devices such as a mobile device, computer, hand-held computing device, mobile telephone, head set and a wearable computer, PC peripheral devices such as a printer etc., and human interface devices such as data pad, mouse, etc. The BT system has been developed through a collaboration of telecommunication, networking and similar industries to implement an ad-hoc radio frequency (RF) networking between a plurality of personal computers and devices. The BT system was developed by the Intel, Ericsson, IBM, Nokia and Toshiba (registered trademarks) joining the BT SIG (special interest group). Owing to the BT system, a notebook computer, PDA (personal digital assistant) or mobile telephone can share information and various services with a personal computer by a radiocommunication, and thus there is no necessity for any troublesome cable connection between them. For the BT system, standards for radiocommunication interface and control software were established to assure an interoperability between the devices, and they are disclosed in the "BT (trademark) Special Interest Group, BT Specification Version 1.0".

Referring now to FIG. 1, there is schematically illustrated the whole construction of a conventional radiocommunication system adopting the BT system. The radiocommunication system is indicated with a reference 100. As shown, this radiocommunication system 100 includes a mobile telephone 101, personal computer 102, digital camera 103 and a personal digital assistant (PDA) 104, each having a radiocommunication module 110 by which they are enabled to make mutual data communication with each other.

Also, for dial-up access from the mobile telephone 101 in the radiocommunication system 100 to an Internet network 300 via a mobile network 200, the mobile telephone 101 is connected by the personal computer 102, digital camera 103 and PDA 104 to an Internet service provider 301 in the Internet network 300, and to a WWW (worldwide web) server 302 in the Internet network 300.

Thus, the radiocommunication system 100 enables the personal computer 102, digital camera 103 and PDA 104 to wirelessly connect to the Internet network 300, not via the mobile telephone 101 and cable. Therefore, the radiocommunication system 100 permits to improve the portability of the personal computer 102, digital camera 103 and PDA 104. Also, the radiocommunication system 100 enables the user or subscriber to access the Internet network 300 holding only a terminal like the PDA 104 in hand with the mobile telephone 101 being kept in his or her bag or the like.

Next, the construction of a host device 500 included in the radiocommunication system 100 will be described with reference to FIG. 2. The host device 500 corresponds to the personal computer 102, digital camera 103 or PDA 104 shown in FIG. 1.

As shown in FIG. 2, the host device 500 includes a radiocommunication module 510 corresponding to the radiocommunication module 110 and which controls communication with the outside, and a host controller 530 which controls the host device 500 itself.

The radiocommunication module 510 includes a radiocommunication unit 511 to control radiocommunication within the radiocommunication system 100, an antenna 512 for data communication with each of the components of the radiocommunication system 100, a base-band controller 513 to control the radiocommunication unit 511, and an interface 514 connected by a cable to the host controller 530 for data input and output.

The base-band controller 513 provides a control over the radiocommunication unit 511, including frequency hopping control. Also, the base-band controller 513 converts data to a predetermined format for sending via the radiocommunication module 510, while converting received data in the predetermined format for output to the host controller 530.

The radiocommunication unit 511 includes a receiver 521 to receive radio data from the antenna 512, transmitter 522 to send radio data from the antenna 512, switch 523 to select whether radio data from the transmitter 522 should be sent via the antenna 512 or radio data from the antenna 512 should be provided to the receiver 521, and a hopping synthesizer 524 to generate a local frequency for use in the receiver 521 and transmitter 522 and spread the spectrum by the frequency hopping.

The radiocommunication module 510 further includes a RAM (random-access memory) 516, ROM (read-only memory) 517 and a CPU (central processing unit) 518, each connected to a system bus 515 composed of an address bus and data bus.

The CPU 518 reads, from the ROM 517 via the system bus 515, a control program intended to control each of the components of the radiocommunication module 510, to generate a control signal for controlling each component. At this time, the CPU 518 stores data in the RAM 516 as a work area as necessary to execute the control program. Thereby, the CPU 518 controls the base-band controller 513 and radiocommunication unit 511 to control radiocommunication with other devices included in the radiocommunication system 100, while sending and receiving user data to and from the host controller 530 via the interface 514.

The host controller 530 in the host device 500 includes an interface 531 for input and output of signals from and to the interface 514 in the radiocommunication module 510, a network setting storage 533 to store network setting information such as server address etc. of the Internet service provider 301 when the host device 500 is connected to the Internet, a personal information storage 534 to store personal information such as user ID, mail address, password, etc of each user having the host device 500, and a CPU 535 to control each of these components of the host controller 530. These components of the host controller 530 are connected to a system bus 532. The host controller 530 further includes a power supply 536 which supplies a power to the radiocommunication module 510.

For connection between the host device 500 and Internet network 300, network setting information stored in the network setting information storage 533 and personal information stored in the personal information storage 534 are first provided to the radiocommunication module 510, and then the radiocommunication unit 511 and base-band controller 513 are controlled to make a setting for connection to the Internet network 300 by the CPU 518 in the radiocommunication module 510 by the use of the network setting information and personal information, to thereby establish a connection between the host device 500 and WWW server 302.

For addition of the BT-based radiocommunication function to each component, the latter has to incorporate the radiocommunication module 510 having a BT radiocommunication function. FIG. 3 shows protocol stacks 610 and 620 for the mobile telephone 101 and PDA 104 each having the radiocommunication module 510.

As shown, each of the protocol stacks 610 and 620 has five layers as lower layers to implement the BT-based radiocommunication system 100, including an RF layer for FH and data communications in the 2.4 GHz band, BB (base-band) layer for base-band control, LMP (link manager protocol) layer for handling including connection, disconnection and link, L2CAP (logical link control and adaptation protocol) layer for multiplexing, segmentation and decomposition of various protocols, and RFCOMM layer being a simple transport protocol to emulate the RS-232C serial line.

The mobile telephone 101 and PDA 104 use these five layers for data communications inside the radiocommunication system 100.

Also, the protocol stack 620 has provided above the RFCOMM layer thereof a PPP (point to point protocol) used for dial-up connection to the Internet network 300, an IP (Internet protocol) required for connection to the Internet network 300 and a TCP (transmission control protocol). These protocols are used to send and receive data to and from an application layer (AP).

As in the above, the protocol stack 610 provided in the mobile telephone 101 has the lower five layers similar to those in the protocol stack 620 to implement the BT-based radiocommunication system 100. It also has provided above the RFCOMM layer thereof a data communication mode layer for connection to the mobile network 200. The data communication mode layer includes data communication mode layers for mobile telephone such as a CDMA-ONE (code division multiple access-ONE), W-CDMA (wideband-code division multiple access), etc. Thus, the radiocommunication system 100 uses the higher four layers of the PDA 104 to encapsulate the data by TCP/IP data and sends TCP/IP-encapsulated data to the PDA 104 by the use of the lower five layers, while encapsulating data by TCP/IP received via the mobile telephone 101 to make a connection to the Internet network 300 via the mobile network 200.

However, the method for constructing the radiocommunication system 100 as in the above is not advantageous as will be described below.

That is, an Internet protocol stack (TCP/IP, PPP) to enable a connection to the Internet network 300 via the radiocommunication system 100 has to be installed in the mobile telephone 101, PDA 104, etc. included in the radiocommunication system 100, which will cause the hardware of each of these devices 102 to 104 and software for them to be larger and thus complicate the construction of each of the devices 102 to 104. The Internet protocol stack adds to the costs of manufacturing the devices 102 to 104, and it often is a redundant design for the users who will not access the Internet network 300, for example.

Furthermore, the devices 102 to 104 included in the radiocommunication system 100 as shown in FIG. 2 have to store the network setting information such as address, mail address, password, etc. of the Internet service provider 301 and the personal information in the network setting information storage 533 and personal information storage 534, respectively, since such information is required for access to the Internet network 300.

Therefore, the user has to set network setting information and personal information for each of the devices 102 to 104. With a small portable device having only a man-machine interface function which is not sufficient, the setting of such network setting information and personal information will be very troublesome to the user of such a device. Thus, for easier setting of various information, a complicate man-machine interface has to be installed in each of the devices 102 to 104.

Among others, when selecting another Internet service provider 301, settings for access to the network have to be changed for each of the devices 102 to 104 included in the radiocommunication system 100.

DISCLOSURE OF THE INVENTION

Accordingly, the present invention has an object to overcome the above-mentioned drawbacks of the prior art by providing a communication apparatus and method permitting to easily make a network setting for connection of each host device included in a radiocommunication system to an Internet network or the like.

The above object can be attained by providing a communication apparatus including a first radiocommunication means for sending and receiving data to and from a host device via a radiocommunication network, a second radiocommunication means for sending and receiving data to and from a communication device connected to an external communication network outside the radiocommunication network, via the radiocommunication network, a storage means for storing communication setting information on the external communication network, and a communication controlling means for setting a relation of connection to the external communication network via the radiocommunication network and communication device on the basis of the communication setting information stored in the storage means and controlling the first and second radiocommunication means to transfer data between the external communication network and host device.

Also, the above object can be attained by providing a communication method for a communication apparatus which sends and receives data to and from a host device via a radiocommunication network, and to and from a communication device connected to an external communication network outside the radiocommunication network via the radiocommunication network, comprising the steps of setting a relation of connection with the external communication network via the communication device by a use of internally stored communication information on the external communication network, and sending and receiving data to and from the external communication network via the communication device by the use of the relation of connection with the external communication network, while sending and receiving data to and from the host device via the radiocommunication network, thereby controlling the data transfer between the host device and external communication network.

BEST MODE FOR CARRYING OUT THE INVENTION

These objects and other objects, features and advantages of the present invention will become more apparent from the following detailed description of the preferred embodiments of the present invention when taken in conjunction with the accompanying drawings.

Figure 1:
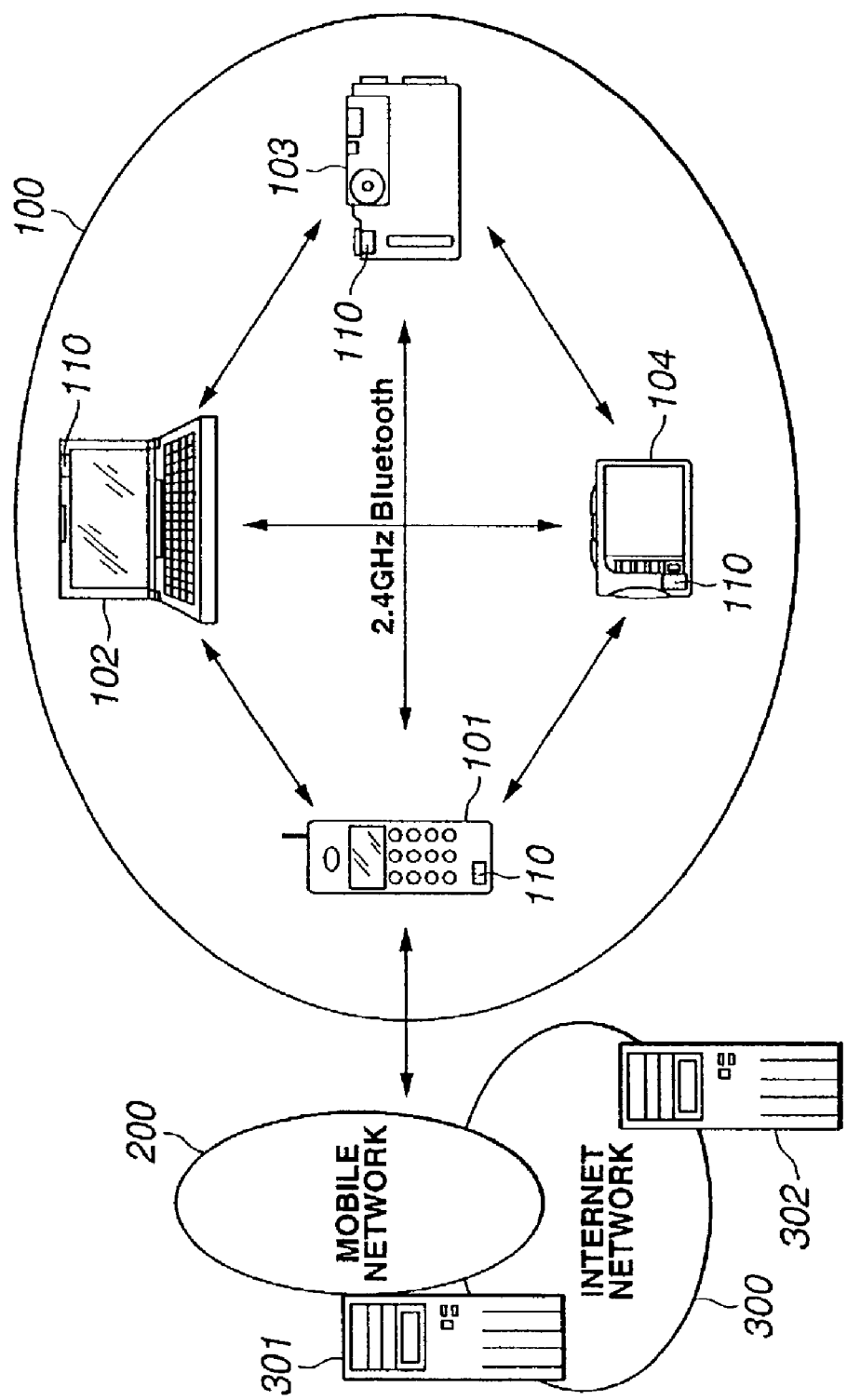
FIG. 1 schematically illustrates the whole construction of a conventional radiocommunication system.
Figure 2:
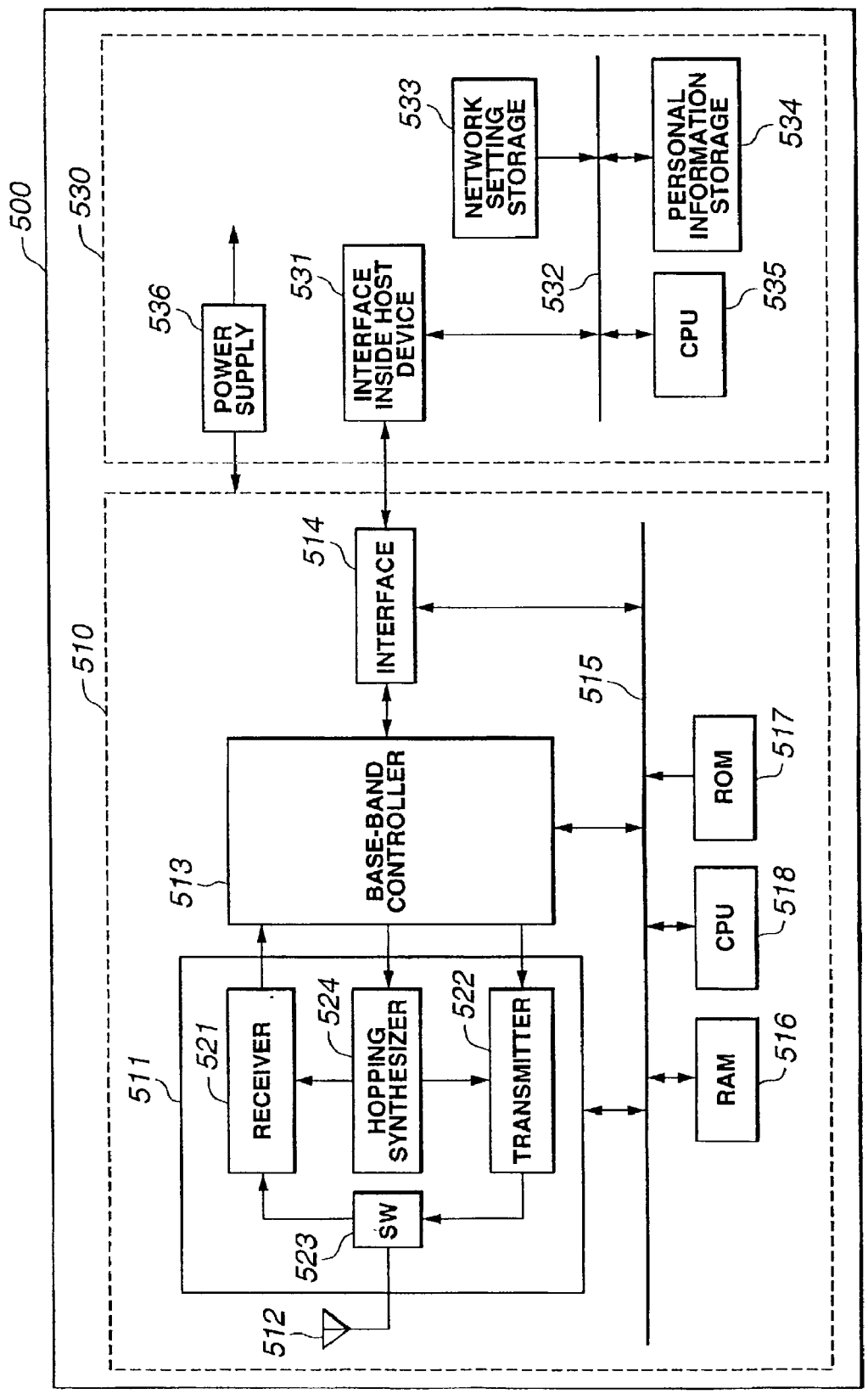
FIG. 2 is a block diagram of a host device included in the conventional radiocommunication system.
Figure 3:
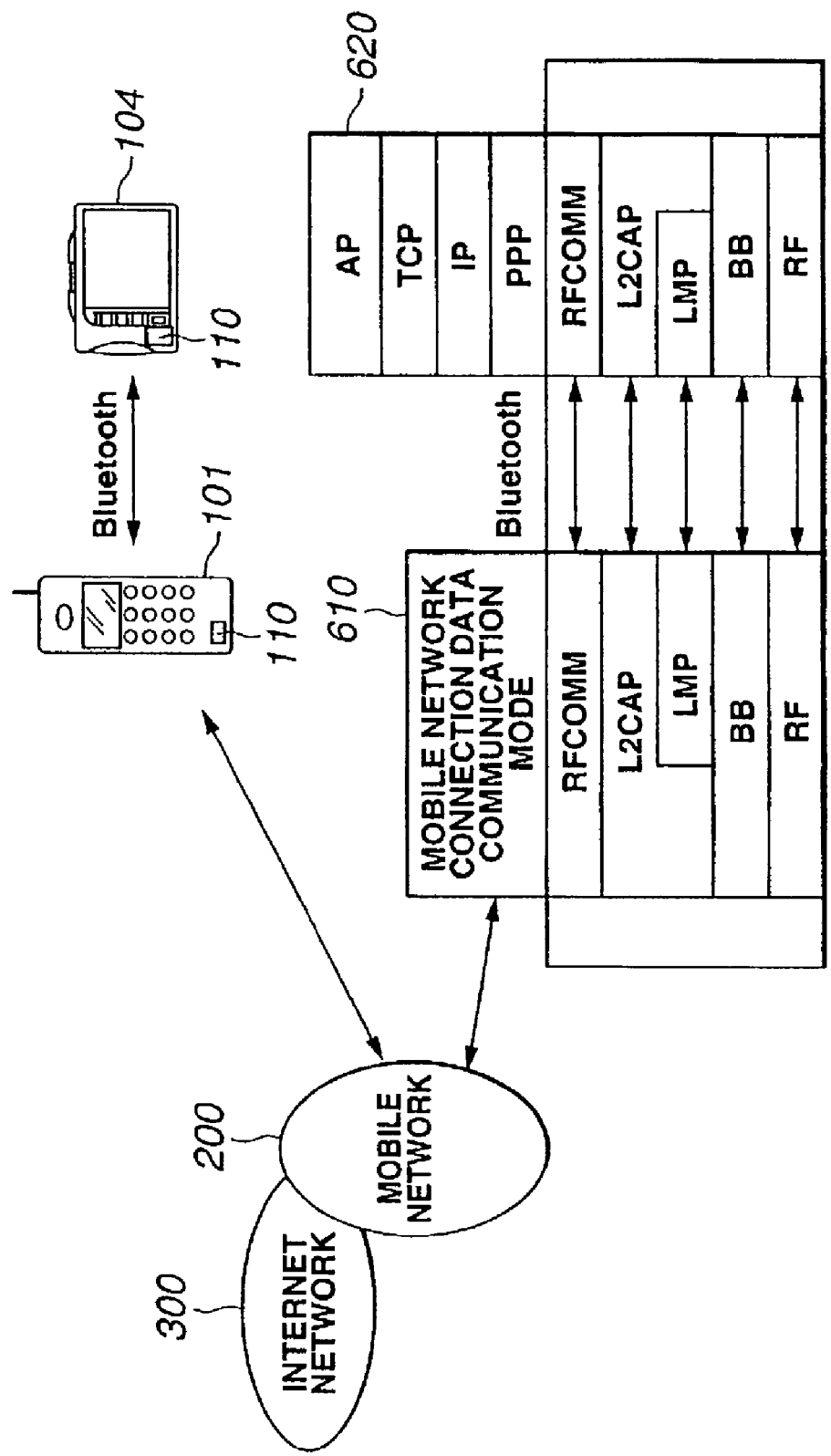
FIG. 3 explains protocol stacks for a mobile telephone and host device, respectively, included in the conventional radiocommunication system.
Figure 4:
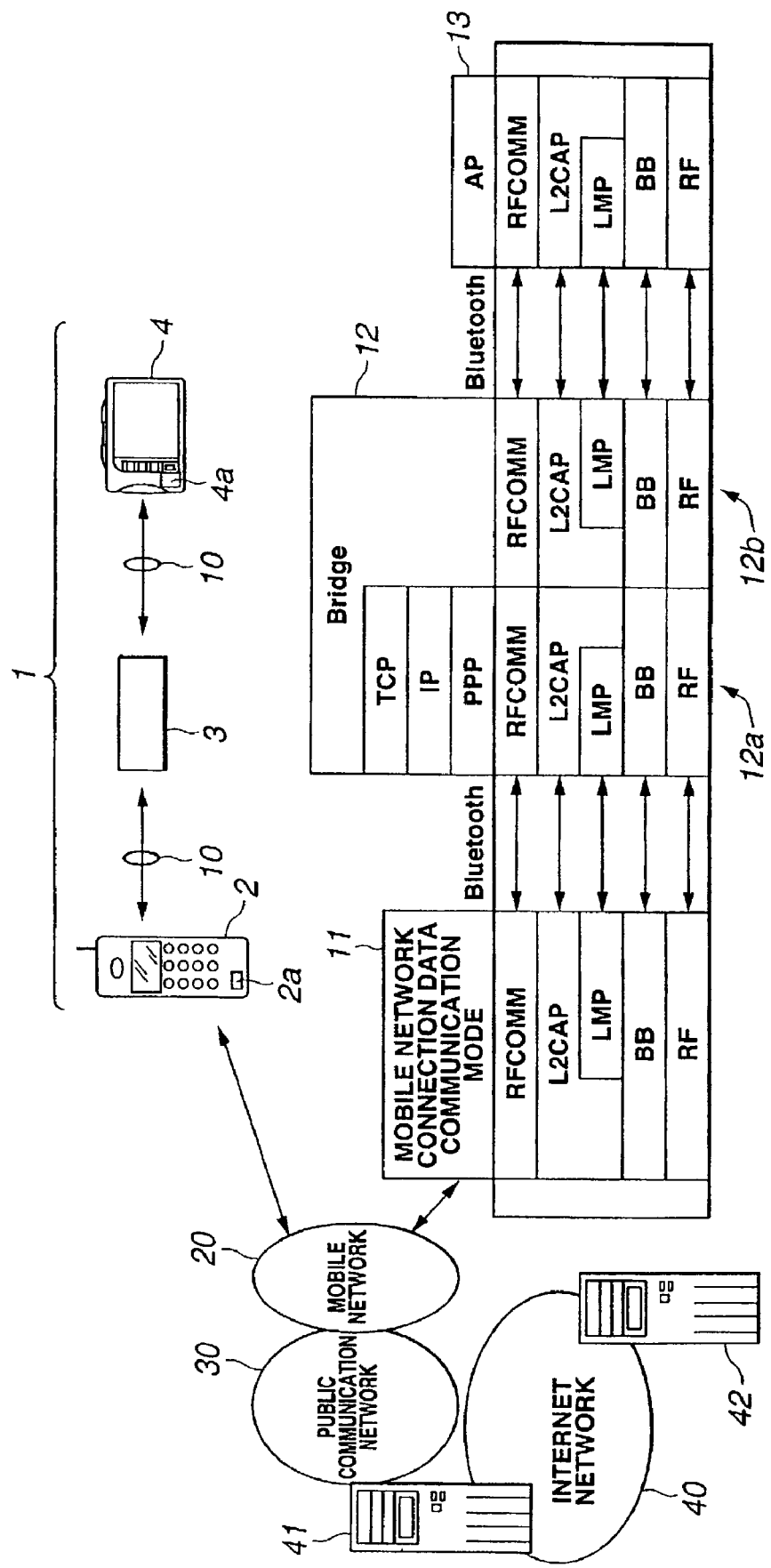
FIG. 4 schematically illustrates the construction of the radiocommunication system according to the present invention, relation between the radiocommunication system and external communication network, and a protocol stack for the mobile telephone, radiocommunication device and host device included in the radiocommunication system.

Referring now to FIG. 4, there is schematically illustrated the construction of the radiocommunication system according to the present invention. The radiocommunication system is generally illustrated with a reference 1.

As shown, the radiocommunication system 1 adopts the Bluetooth (will be referred to as "BT" hereunder) system to implement data communications between an external communication device 2 serving as a gateway, radiocommunication device 3 and a host device 4.

The BT system is a name of a short-range radiocommunication technique whose standardization was started in May, 1998 by the five European and Japanese industries having previously been described. Based on this BT system, a short-range radiocommunication network whose maximum data transfer rate is 1 Mbps (effectively, 721 kbps) and maximum sending distance is on the order of 10 m is organized for data communications. According to the BT system, 79 channels whose bandwidth is 1 MHz are set in an ISM (industrial scientific medical) frequency band in the 2.4 GHz band which can be used with no official permission to send and receive radio data between the external communication device 2, radiocommunication device 3 and host device 4 by the use of the spread spectrum technique by the frequency hopping in which a channel is switched 1600 times per sec.

In a short-range radiocommunication network 10 adopting the BT system, there is employed a slave/master system consisting of a master device determining a frequency hopping pattern and a slave device being a communication counterpart controlled by the master device, differentiated based on operations these devices will effect. The master device can make simultaneous data communications with seven slave devices. A subnet composed of a total of eight devices including one master device and seven slave devices is called "piconet", the host device 4 taken as a slave device, included in th piconet, that is, in the radiocommunication system 1, can be a slave device of more than two piconets at a time.

As shown in FIG. 4, the radiocommunication system 1 includes, for example, the radiocommunication device 2 for data communications with an Internet network 40, public communication network 30, and mobile network 20, the radiocommunication device 3 for BT-based transfer of packets including user data between the external communication device 2 and host device 4 via the short-range radiocommunication network 10, and the host device 4 for sending and receiving packets including user data etc. to and from the radiocommunication device 3.

The host device 4 is an electronic device wirelessly connected to the radiocommunication device 3 via the short-range radiocommunication network 10 and which is operated by the user. The host device 4 includes, for example, a PDA (personal digital assistant), digital camera, mailing processing terminal, EMD (electronic music distribution) terminal or the like. The host device 4 has installed therein a BT module 4a to send to and received from the radiocommunication device 3 inside the radiocommunication system 1 on the basis of the BT system. The BT module 4a has a protocol for BT-based data communications with the radiocommunication device 3, and a module to execute the protocol.

The host device 4 is operated by the user, for example, to generate operation input signal. The host device 4 generates an operation input signal for a connection to the external communication device 2 via the radiocommunication device 3 and short-range radiocommunication network 10 for example and sends a control command which is based on the operation input signal to the radiocommunication device 3. Thus, when the external communication device 2 connects to the public communication network 30, the host device 4 will connect to the public communication network 30 and Internet network 40 via the short-range radiocommunication network 10 and mobile network 20.

The external communication device 2 is connected to the radiocommunication device 3 is connected to the radiocommunication device 3 via the short-range radiocommunication network 10, and also to the mobile network 20, public communication network 30 and Internet network 40. That is, the radiocommunication device 3 serves as a gateway for making a connection between the host device 4 and Internet network 40. The external communication device 2 has installed therein a BT module 2a to send and receive data to and from the radiocommunication device 3 inside the radiocommunication system 1 on the basis of the BT system. The BT module 2a has a protocol for BT-based data communications with the radiocommunication device 3, and a module to execute the protocol.

The external communication device 2 includes, for example, a personal computer with a modem for use to connect to the public communication network 30, a mobile telephone adopting, for example, CDMA-one (code division multiple access-one) or W-CDMA (wideband-code division multiple access) method, TA/modem, STB (set top box), quasi-public communication system such as a BT-based base station for making a connection between the radiocommunication device 3 and public communication network 30, a radio terminal using the HDR (high data rate) system a which is a wireless Internet access system proposed by the Qualcomm or the like.

The public communication network 30 includes, for example, the Internet network 40 connected to a personal computer via a telephone line, a mobile network 20 connected to a mobile telephone, an ISDN (integrated services digital network)/B (broadband)-ISDN connected to a TA/modem, a satellite broadcasting network connected to an STB, WLL (wireless local loop) connected to a quasi-public communication network or the like.

The Internet network 40 includes the Internet service provider 41 and WWW server 42 as well as an information server, mail server, EMD server and a community server.

The information server receives a request from the host device 4 via the radiocommunication device 3 and external communication device 2, and sends information corresponding to the request to the host device 4. Also, the mail server manages the electronic mail to send and receive an electronic mail to and from the host device 4 via the external communication device 2 and radiocommunication device 3. Furthermore, the EMD server sends music information to an EMD terminal of the host device 4 via the external communication device 2 and radiocommunication device 3 in order to manage the music distribution service. Moreover, the community server provides, for example, town information and news information download service to the digital camera being the host device 4, and manages uploading of information etc. from the host device 4.

Next, the present invention will further be described concerning the radiocommunication system 1 composed of only the external communication device 2 being a mobile telephone (communications device) destined for data transfer to and from the mobile network 20, radiocommunication device 3 which makes BT-based transfer of packets to and from the mobile telephone 2 via the short-range radiocommunication network 10, and the host device 4 which makes BT-based transfer of packets to and from the radiocommunication device 3, as shown in FIG. 4. This construction of the radiocommunication system 1 is intended for the simplicity of the illustration and explanation.

Protocol stacks 11, 12 and 13 installed in the mobile telephone 2, radiocommunication device 3 and host device 4, respectively, included in the radiocommunication system 1 will be described herebelow.

The mobile telephone 2 has installed therein five lower protocols for implementing the BT-based radiocommunication system 1. Each of the mobile telephone 2, radiocommunication device 3 and host device 4 have installed therein five such lower layers including an RF layer for making FH and data transfer in the 2.4 GHz band, BB (base-band) layer for base-band control, LMP (ink manager protocol) layer for connection, disconnection and link handling, L2CAP (logical link control and adaptation protocol) layer for multiplexing, segmentation and decomposition of various protocols, and an RFCOMM layer being a simplified transport protocol for emulation of the RS-232C serial line. The mobile telephones 2, radiocommunication device 3 and host device 4 use these five protocols for transfer of radio data inside the radiocommunication system 1.

The mobile telephone 2 has installed therein mobile network connection protocols such as W-CDMA (wideband-code division multiple access) protocol etc. as higher layers in relation to the lower layers intended for implementation of the BT system. Having installed therein the W-CDMA protocol as the mobile network connection protocol, the mobile telephone 2 connects to the mobile network 20 and is put into the data communication mode by the radiocommunication device 3 for a connection to the public communication network 30 via the mobile network 20.

The host device 4 has installed therein RF, BB, LMP, L2CAP and RECOMM layers intended for BT-based transfer of radio data to and from the mobile telephone 2 and radiocommunication device 3 via the short-range radiocommunication network 10. The host device 4 has also installed therein an application layer (AP) as a higher layer than the RFCOMM.

The radiocommunication device 3 has installed therein a protocol stack 12a for a connection to the mobile telephone 2 via the short-range radiocommunication network 10, and a protocol stack 12b for a connection to the host device 4 via the short-range radiocommunication network 10. The radiocommunication device 3 has installed in the protocol stack 12a RF, BB, LMP, L2CAP and RFCOMM intended for sending and receiving radio data to and from the mobile telephone 2, and has also installed in the protocol stack 12b RF, BB, LMP, L2CAP and RFCOMM intended for sending and receiving radio data to and from the host device 4. That is, the radiocommunication device 3 has installed therein two sets of protocols for sending and reception of radio data to and from the short-range radiocommunication network 10.

The radiocommunication device 3 has the protocol stack 12a corresponding to the protocol stack 11 in the mobile telephone 2 and the protocol stack 12b corresponding to the protocol stack 13 in the host device 4, so that the radiocommunication device 3 can make BT-based transfer of radio data to the mobile telephone 2 and host device 4. The radiocommunication device 3 makes transfer of packets between the RECOMM installed in the mobile telephone 2 and its own RFCOMM.

Further, the radiocommunication device 3 has installed therein PPP (point to point protocol) positioned in the link layer when the radiocommunication device 3 is connected to the Internet network, IP (Internet protocol) position in the network layer and TCP (transmission control protocol) position in the transport layer, as higher layers than the RFCOMM in the protocol stack 12a.

Furthermore, the radiocommunication device 3 has installed therein as a higher layer than the TCP in the protocol stack 12a and RFCOMM in the protocol stack 12b a bridge via which the radiocommunication device 3 transfers data between the protocol stacks 12a and 12b.

In the radiocommunication system 1, when sending user data generated at the AP in the host device 4 from the mobile telephone 2 to the Internet network 40 via the radiocommunication device 3, the host device 4 operates according the lower layers in the protocol stack 13 to send radio data to the radiocommunication device 3. Next, the radiocommunication device 3 operates according to each of the protocols in the lower layers in the protocol stack 12b to receive the user data and bridges it to the TCP in the protocol stack 12a via the bridge. Further, the radiocommunication device 3 adds a header according to the TCP/IP to the user data in each of the TCP, IP and PPP in the protocol stack 12a to encapsulate the user data, processes the encapsulated user data according to the protocols in the lower layers and sends it the mobile telephone 2. Next, the mobile telephone 2 operates according to the protocols in the lower layers in the protocol stack 11 to receive TCP/IP packets from the radiocommunication device 3, and operates according to the mobile network connection protocol to send TCP/IP packets generated by the radiocommunication device 3, thereby sending the TCP/IP packets to the Internet service provider 41 via the mobile network 20 and public communication network 30 and then to the Internet network 40.

Also, in the radiocommunication system 1, when receiving data from the Internet network 40 by the host device 4, the TCP/IP packet sent via the Internet network 40, public communication network 30 and mobile network 20 are received by the mobile telephone 2. The mobile telephone 2 operates according to the mobile network connection protocol and protocols in the lower layers to send the TCP/IP protocols to the radiocommunication device 3. Next, the radiocommunication device 3 receives, at the lower layers in the protocol stack 12a the TCP/IP packets from the mobile telephone 2, and processes the TCP/IP packet according to the higher layers to remove the header from the TCP/IP packet, thereby extracting the data. Then, the radiocommunication device 3 bridges the extracted data from the protocol stack 12a to the protocol stack 12b and processes it according to the lower layers to send it to the host device 4. Thereby, in the radiocommunication system 1, the data from the Internet network 40 is received by processing it according to the lower five layers at the host device 4.

Figure 5:
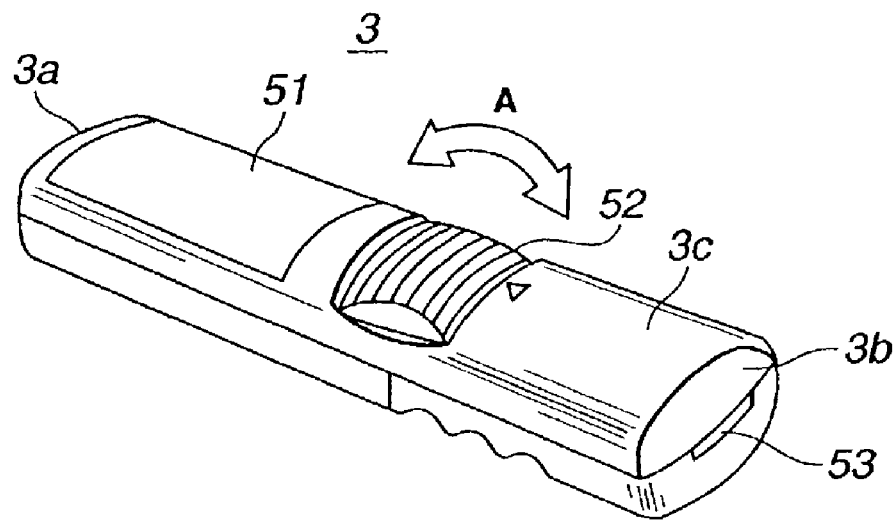
FIG. 5 is a perspective view of the radiocommunication device according to the present invention.
Figure 6:
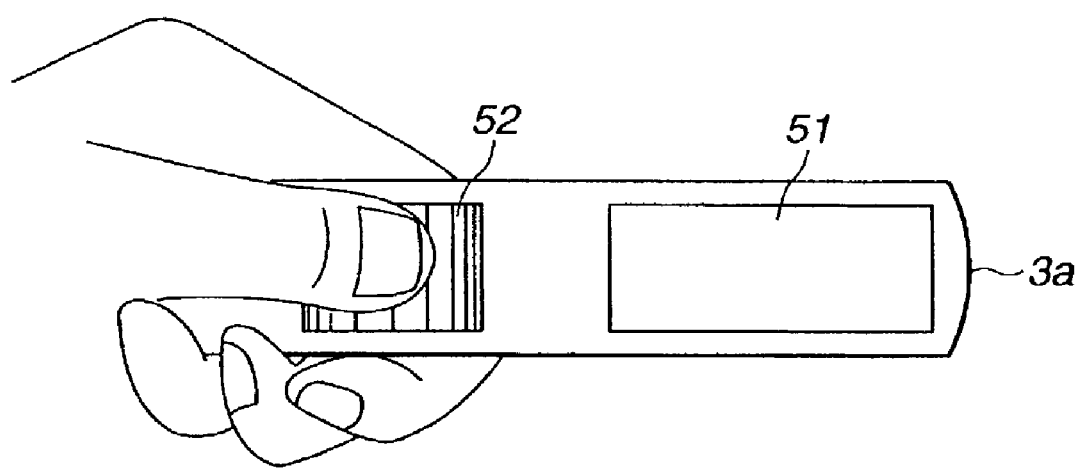
FIG. 6 is a plan view of the radiocommunication device in FIG. 5.

The radiocommunication device 3 included in the aforementioned radiocommunication system 1 has an appearance as shown in FIGS. 5 and 6.

As shown in FIG. 5, the radiocommunication device 3 has a generally cylindrical body having a display unit 51 and operation unit 52 provided on one side 3c thereof. The display unit 51 and operation unit 52 are provided in the order from one end 3a towards the other end 3b of the body. The radiocommunication device 3 has provided at the end 3a thereof an antenna via which data is sent to and received from the mobile telephone 2 and host device 4, and at the end 3b a slot 53 into which a card is to be inserted.

The display unit 51 is formed from a liquid crystal display for example to display various contents. The display unit 51 displays for example user data the radiocommunication device 3 sends to and receives from the mobile telephone 2 and host device 4, operations effected at the radiocommunication device 3, data for control of the operations of the radiocommunication device 3, mobile telephone 2 and host device 4, information on a card inserted in the card slot 53.

The operation unit 52 is for example a rotary dial the user can rotate in the directions of arrow A in FIG. 5. The rotary dial as the operation unit 52 can also be depressed towards the center of rotation. The operation unit 52 is operated by the user to produce operation input signals intended to control operations of the radiocommunication device 3.

The card slot 53 has such a depth that a card can be inserted. The card slot 53 receives for example a memory card having stored therein user data such as images, music pieces, etc. or a function card to impart various functions to the radiocommunication device 3. The card slot 53 is internally provided with a terminal (not shown) for mechanical connection to a card inserted therein for input and output of signals. A card inserted in the card slot 53 supplies and receives signals to and from the radiocommunication device 3. The terminal provided inside the card slot has 10 pins for example as specified in the serial interface standard.

More specifically, the card slot 53 provides a serial interface which can access for example the Memory Stick (trade name). That is, the card slot 53 has a plurality of terminals for input and output of bus state, data, clock, etc. indicating the state of the serial bus when the card is connected to the radiocommunication device 3. A card for use as inserted in the card slot 53 may be a one having the same shape and specifications as those of any existing memory card incorporating a flash memory and adopting the serial protocol as the interface. Namely, the memory card for insertion into the card slot 53 has an enclosure of 50.0 mm in length, 2.5 mm in width, and 2.8 mm in thickness for example and in which a flash memory and memory controller are enclosed. In this radiocommunication device 3, only three of the 10 pins are used for the data, clock and bus state, respectively, and a half duplex transfer of data is effected bidirectionally.

The above radiocommunication device 3 has such a size as the user can hold in the hand as shown in FIG. 6. By operating the operation unit 52 with the thumb, the user can change contents displayed on the display unit 51 and produce operation input signals indicative of sending and reception of data and command to and from the mobile telephone 2 or host device 4 via the short-range radiocommunication network 10.

Figure 7:
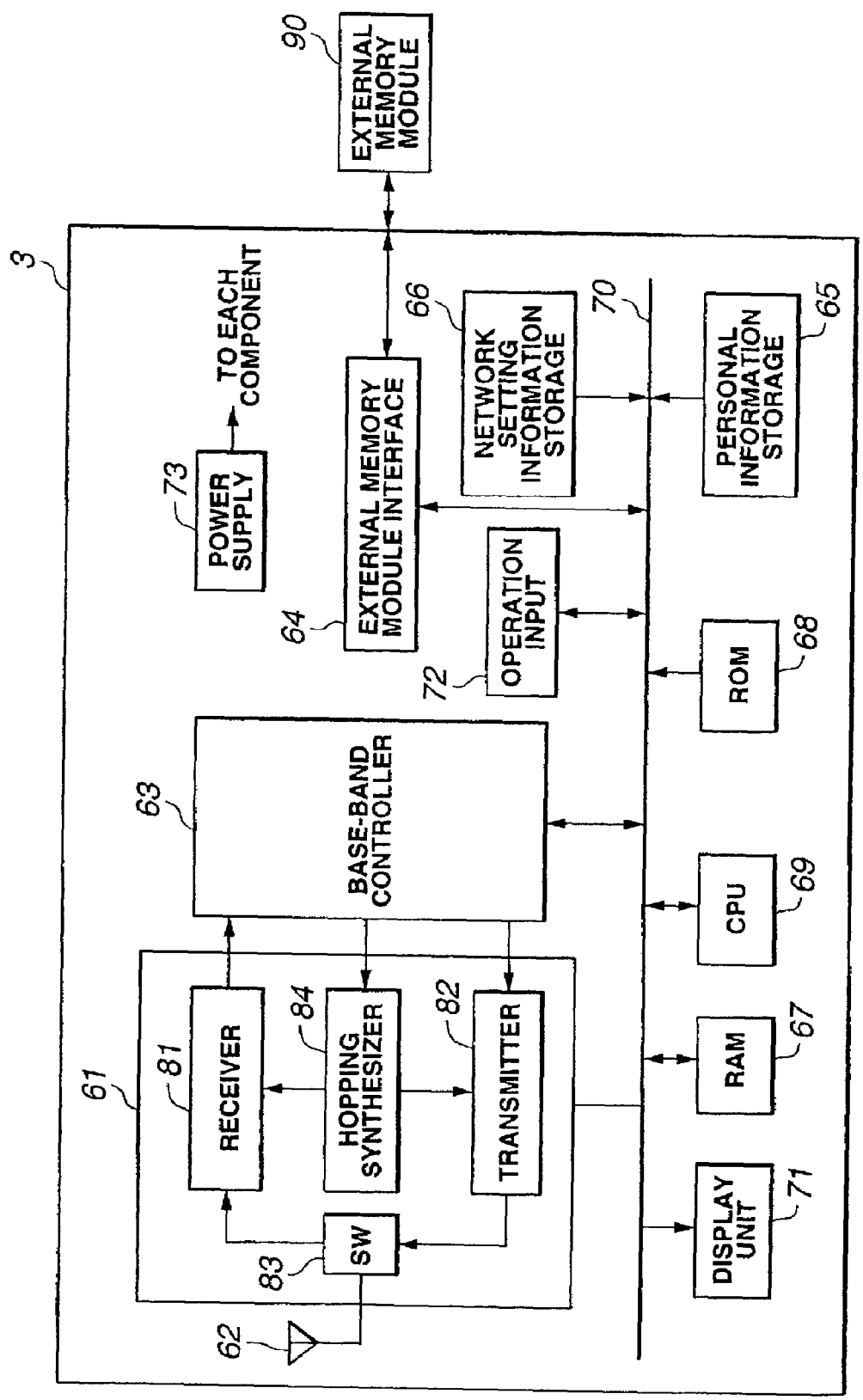
FIG. 7 is a block diagram of the radiocommunication device in FIG. 5.

Referring now to FIG. 7, there is illustrated in the form of a block diagram the radiocommunication device 3 included in the radiocommunication system 1.

As shown in FIG. 7, the radiocommunication device 3 includes a radiocommunication unit 61 for sending and reception of radio data which is sent and received by the radiocommunication system 1, antenna 62 for sending and reception of radio data to and from each of component devices included in the radiocommunication system 1, and a base-band controller 63 to control the communications effected in the radiocommunication unit 61.

In case the radiocommunication device 3 is designed to have the appearance as shown in FIG. 5, the antenna 62 is provided at the one end 3a of the radiocommunication device 3. The antenna 62 consists of an antenna to send and receive radio data whose frequency is included in the 2.4 GHz band (2.402 to 2.480 GHz). The antenna 62 sends radio data from the radiocommunication unit 61 to the mobile telephone 2 or host device 4 via the short-range radiocommunication network 10, while receiving radio data from the mobile telephone 2 or host device 4 via the short-range radiocommunication network 10 and providing it to the radiocommunication unit 61.

The radio data sent and received by the antenna 62 via the short-range radiocommunication network 10 is of a predetermined number of bits, and sent and received as a packet consisting of user data and control data. The packet is the smallest unit of data thus sent and received.

As shown in FIG. 7, the radiocommunication unit 61 includes a receiver 81 to receive radio data coming from the antenna 62, a transmitter 82 to send radio data from the antenna 62, a switch 83 to select whether radio data from the transmitter 82 is to be sent via the antenna 62 or whether radio data from the antenna 62 is to be provided to the receiver 81, and a hopping synthesizer 84 to make spread spectrum, by the frequency hopping, of radio data from the receiver 81 and transmitter 82.

The switch 83 operates in response to a control signal from a radiocommunication CPU (central processing unit) 69 which will further be described later. When radio data is received by the antenna 62, the switch 83 will operate to A provide the radio data from the antenna 62 to the receiver 81. When radio data is sent from the antenna 62, the switch 83 will operate to provide the radio data from the transmitter 82 to the antenna 62.

The receiver 81 is supplied with radio data from the switch 83, and provides it to the base-band controller 63. The hopping synthesizer 84 designates a hopping frequency pattern, and the receiver 81 removes a carrier in the 2.4 GHz band according to a frequency pattern which will be when radio data is received, converts the radio data to data of 0 and 1 and provides the 0 and 1 data to the base-band controller 63. At this time, the receiver 81 multiplies the data by a frequency pattern designated in packets by the hopping synthesizer 84 to remove the carrier from the radio data and provides the radio data to the base-band controller 63.

The transmitter 82 is supplied with radio data of 0 and 1 in packets, having been generated by the base-band controller 63 and subjected to a primary modulation, as radio data which is provided to the mobile telephone 2 or radiocommunication device 3 from the antenna 62 via the short-range radiocommunication network 10, and provides the data to the switch 83. The hopping synthesizer 84 designates a frequency pattern, and the transmitter 82 generates radio data on which a carrier in the 2.4 GHz band is superposed according to the designated frequency pattern, and provides the radio data to the switch 83. At this time, the transmitter 82 superposes, in packets, the carrier on the radio data according to the frequency pattern designated by the hopping synthesizer 84, and sends the radio data.

The base-band controller 63 designates a hopping pattern for the frequency hopping by the hopping synthesizer 84. The hopping synthesizer 84 is controlled by the base-band controller 63 to designate the same frequency pattern to both the receiver 81 and transmitter 82.

When receiving radio data from the antenna 62, the hopping synthesizer 84 changes the frequency of a carrier to be removed by the receiver 81, for each slot according to a frequency pattern designated by the base-band controller 63.

Also, when sending radio data from the antenna 62, the hopping synthesizer 84 changes the frequency of a carrier to be superposed on the data by the transmitter 82, for each slot according to a frequency pattern intended to change the frequency of data from the base-band controller 63 by the transmitter 82.

The hopping synthesizer 84 controls the frequency for a frequency hopping at 1600 times per sec on 79 channels (2.402 to 2.480 GHz) with an interval of 1 MHz between two successive ones thereof for example.

The base-band controller 63 is supplied with radio data in packets from the receiver 81 and demodulates the radio data having been subjected to a frequency antenna 62, the base-band controller 63 makes a primary modulation of data to be sent and provides it to the transmitter 82.

Furthermore, the base-band controller 63 gives a hopping pattern to the hopping synthesizer 84 to control the latter. Thereby, the base-band controller 63 controls the transmission timing for radio data to be sent from the radiocommunication device 3 while controlling the reception timing of radio data to be received. The base-band controller 63 gives a frequency pattern of f(k), f(k+1), f(k+2), . . . , for example as a hopping pattern to the hopping synthesizer 84 at every predetermined time.

Moreover, the base-band controller 63 converts data to be sent to a predetermined packet format according to a control signal from the radiocommunication CPU 69 and provides it in packets to the receiver 81, while decomposing a packet having the predetermined packet format from the transmitter 82 and providing the decomposed packet to the radiocommunication CPU 69 via a system bus 70.

Furthermore, the base-band controller 63 has a function to change the output from the transmitter 82. It is supplied with information indicative of a distance between the radiocommunication device 3, mobile telephone 2 and host device 4 from the radiocommunication CPU 69 to control the output power of radio data generated by the transmitter 82.

The radiocommunication device 3 further includes a personal information storage 65 to store personal information given for each user, and a network setting storage 66 to store network setting information necessary for the host device 4 to connect to the public communication network 30, Internet network 40, etc.

The personal information storage 65 stores personal information including the mail address of a user of the host device 4, user ID and password (for connection of PPP) intended to connect to an access point, etc. These data are read into the personal information storage 65 and the content of the latter is controlled, by the radiocommunication CPU 89.

Further, for sending radio data generated by an electronic mail application for example, the personal information storage 65 may store information indicative of a list of electronic mail addresses (address note) of electronic mail destinations, information indicative of sending and reception history, information indicating a list of repetitive sentences for simple input to the host device 4 (for example, digital camera) having no sufficient character input functions, signature information to be added to the end of a sent electronic mail sentence, information indicative of a mail unique ID to differentiate between a received but not yet read electronic mail and a received and already read mail.

Furthermore, the personal information storage 65 may store SIM (subscriber identification module) information. The SIM information stored in the personal information storage 65 is information necessary to differentiate between users, intended for an improved security and having been encrypted inside the radiocommunication device 3. The SIM information includes for example the above-mentioned user ID, user password, mail ID for access to a personal mail box, mail password, user's mail address, personal authentication password for conforming the right of using the radiocommunication device 3 itself, etc. all encrypted.

The network setting storage 66 stores, as network setting information, server address, telephone number of a access point, etc. required for dial-up connection of the host device 4 to the Internet service provider 41 of the Internet network 40. The information is read into the network setting storage 66 and the content of the latter is controlled, by the radiocommunication CPU 69.

Also, the radiocommunication device 3 includes an interface 64 provided inside the card slot 53. The interface 64 is provided with a plurality of signal input/output terminals which can be put into contact with the terminals of a card inserted in the card slot 53 for input and output of signals. The interface 64 provides data to and is supplied with data from makes data transfer to and from an external memory module 90 installed in the card slot 53 and having a memory function.

The interface 64 has 10 pins as signal input/output terminals for example, and supplies data and is supplied with data from the external memory module 90 according to the serial data input/output standard. That is, when the external memory module 90 is inserted in the card slot 53, the interface 64 inputs and outputs bus state indicative of the state of the serial bus, data, clock, etc. to make data input/output.

The radiocommunication device 3 further includes a RAM (random-access memory) 67, ROM (read-only memory) 68 and the radiocommunication CPU 69.

The radiocommunication CPU 69 generates a control signal by loading, from the ROM 68 via the system bus 70, a control program which controls each of the components of the radiocommunication device 3. The radiocommunication CPU 69 stores data taking the RAM 67 as a work'area when necessary, and executes the control program to generate a control signal. Thereby, the radiocommunication CPU 69 controls the base-band controller 63, radiocommunication unit 61 and interface 64 to generate a packet for controlling the communication with any other one of the components included in the radiocommunication system 1, and to transfer data to and from the external memory module 90 via the interface 64.

Furthermore, the radiocommunication device 3 includes a display unit 71 corresponding to the display unit 51 shown in FIG. 5, operation input unit 72 corresponding to the operation unit 52, and a power supply 73 which supplies a power to each of the components of the radiocommunication device 3.

According to controls signals from the radiocommunication CPU 69, the display unit 71 displays, to the user, operations of the radiocommunication CPU 69 and content of data transferred via the interface 64.

The operation input unit 72 is operated by the user to generate an operation input for delivery to the radiocommunication CPU 69. The radiocommunication CPU 69 executes the control program according to the operation input signal from the operation input unit 72 while changing the display on the display unit 71.

The above-mentioned radiocommunication device 3 and host device 4 are in a master/slave relation. The host device 4 is the master while the radiocommunication device 3 and mobile telephone 2 are the slaves. Even for sending user data from the radiocommunication device 3 to the host device 4 for example, the radiocommunication device 3 can send radio data to the host device 4 only when it has received a packet informing that the right of sending to the host device 4 has been acquired. Also, in the radiocommunication system 1, the radiocommunication device 3 operated by the user will serve as the master device while the host device 4 and mobile telephone 2 will be the slave devices.

When a request for connection to the Internet network 40 is made from the host device 4 to the above radiocommunication device 3, the radiocommunication CPU 69 first reads the personal information from the personal information storage 65 and network setting information from the network setting storage 66 via the system bus 70, and stores the information once into the RAM 67. Next, the radiocommunication CPU 69 controls the radiocommunication unit 61 and base-band controller 63 to make operations according to the lower fiver layers in the protocol stacks 12a and 12b, thereby establishing a relation of connection with the host device 4 and mobile telephone 2 via the BT-based short-range radiocommunication network 10. Then, the radiocommunication CPU 69 utilizes the relation of connection via the short-range radiocommunication network 10 and makes operations according to the higher 3 layers in the protocol stack 12a by the use of the network setting information and personal information stored in the RAM 67, thereby connecting the host device 4 and Internet network 40 to each other via the mobile telephone 2.

Figure 8:
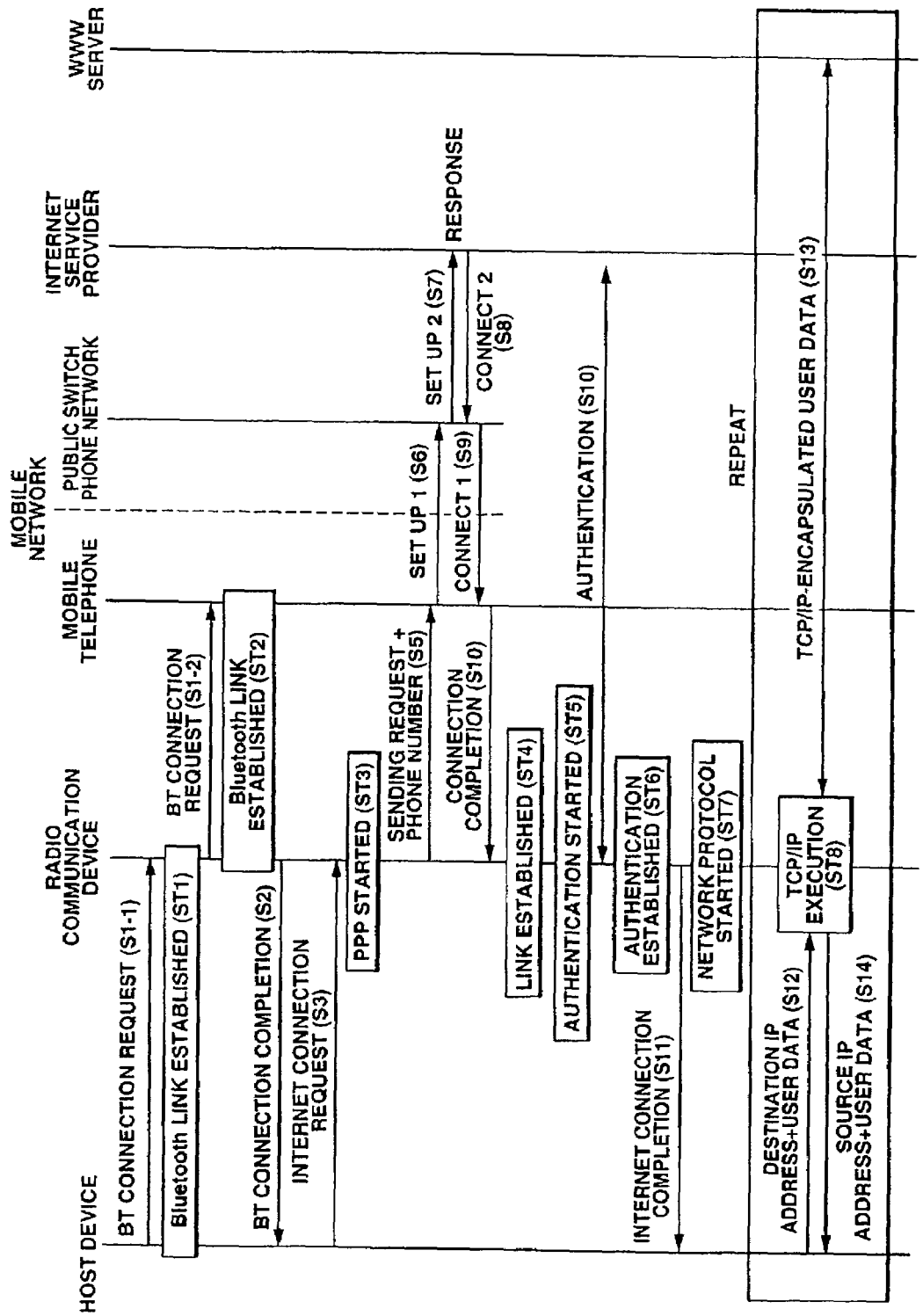
FIG. 8 explains the sequence of controlling mutual communications effected between the radiocommunication device according to the present invention, host device, mobile telephone, mobile network, public communication network, Internet service provider and WWW server.

Next, a procedure for transferring user data between the host device 4 and Internet network 40 with the relation of connection established between them in the above radiocommunication system 1, will be described with reference to FIG. 8. FIG. 8 explains the sequence of controlling mutual communications effected between the seven components including the host device 4, radiocommunication device 3, mobile telephone 2, mobile network 20, public communication network 30, Internet service provider 41 and WWW server 42.

As shown in FIG. 8, first, when an operation input signal requesting a connection with the Internet network 40 is generated by the user operating the host device 4, the host device 4 will send, to the radiocommunication device 3, a BT connection request (S1-1) for a connection with the radiocommunication device 3 via the short-range radiocommunication network 10 in order to establish a BT-based connection with the radiocommunication device 3.

The host device 4 operates according to the lower five layers of the protocol stack 13 while the radiocommunication device 3 operates according to the lower five layers of the protocol stack 12b corresponding to the host device 4, thereby establishing a BT-based link (at step ST1). At this time, the radiocommunication CPU 69 of the radiocommunication device 3 recognizes a request for BT connection (S1-1) from the host device 4, reads out the personal information and network setting information and stores them once into the RAM 67, then controls the radiocommunication unit 61 and base-band controller 63, thereby establishing a link with the host device 4 via the short-range radiocommunication network 10.

The radiocommunication CPU 69 in the radiocommunication device 3 controls the radiocommunication unit 61 and base-band controller 63 to send a request for a BT-based connection (S1-2) to the mobile telephone 2 for establishing a link with the mobile telephone 2 (at step ST2). At this time, the mobile telephone 2 operates according to the lower five layers in the protocol stack 11 while the radiocommunication device 3 operates according to the lower five layers in the protocol stack 12a corresponding to the mobile telephone 2. When a BT-based link with the mobile telephone 2 is established, the radiocommunication device 3 will send a BT connection completion message (S2) to the host device 4.

The host device 4 sends, to the radiocommunication device 3, a request (S3) for a connection to the Internet network 40 via the short-range radiocommunication network 10. The radiocommunication CPU 69 of the radiocommunication device 3 responds to the Internet connection request (S3) from the host device 4 to read the PPP in the protocol stack 12a from the ROM 68 and start it (at step ST3).

Referring to the phone number of the Internet service provider 41, stored as network setting information, in the RAM 67, the radiocommunication CPU 69 controls the radiocommunication unit 61 and base-band controller 63 to send a sending request and phone number (S5) to the mobile telephone 2.

Upon reception of the sending request and phone number (S5) from the radiocommunication device 3, the mobile telephone 2 sends a setup request (SET UP1) (S6) being a call setting message to the public communication network 30 via the mobile network 20.

Upon reception of the setup request (S6), the public communication network 30 sends a setup request (SET UP2) (S7) having the same content as that of the setup request (S6) to the Internet service provider 41.

Receiving the setup request (S7), the Internet service provider 41 responds to the setup request (S7) when it is not busy and can receive user data, to return a response message (CONNECT2) (S8) to the public communication network 30.

Upon reception of the response message (S8) from the Internet service provider 41, the public network 30 transfers a response message (CONNECT1) (S9) to the mobile telephone 2 via the mobile network 20.

Upon reception of the response message (S9) fro the public communication network 30, the mobile telephone 2 recognizes that the connection with the Internet service provider 41 is complete, and sends a connection completion message (S10) to the radiocommunication device 3.

Next, in response to the connection completion message (S10), the radiocommunication device 3 shifts to a link establishment phase (at step ST4).

Next, the radiocommunication CPU 69 starts an authentication according to the PPP (at step ST5), refers to the user ID and password stored as the personal information in the RAM 67, and sends and receives an authentication data (S10) for authentication with the Internet service provider 41. When the authentication with the Internet service provider 41 is established, the radiocommunication CPU 69 shifts to an authentication establishment phase (at ST6).

Upon completion of the authentication, the radiocommunication CPU 69 controls the radiocommunication unit 61 and base-band controller 63 to send an Internet connection completion message (S11) to the host device 4.

Next, the radiocommunication CPU 69 begins to start the network layer protocol, reads a program indicating the operations under the TCP and IP in the protocol stack 12a from the ROM 68, and starts the program. The radiocommunication CPU 69 stores into the RAM 67 an IP address dynamically assigned by the operation under the PPP (at step S17).

Next, the host device 4 sends destination IP address of user data destination and user data (S12) to the radiocommunication device 3 via the short-range radiocommunication network 10. On the other hand, the radiocommunication CPU 69 stores the destination IP address and user data (S12) from the host device 4 once into the RAM 67, and executes the TCP/IP (at step ST8). That is, the radiocommunication CPU 69 adds TCP header to the user data while adding IP header to the user data by taking its own IP address stored in the RAM 67 as a source IP address and using the source IP address and destination IP address, thereby encapsulating the user data by the TCP/IP. The host device 4 sends the user data encapsulated by the TCP/IP (S13) to the WWW server 42 designated with the destination IP address via the Internet service provider 41.

When the TCP/IP-encapsulated user data (S13) is sent from the WWW server 42 to the radiocommunication device 3 via the Internet service provider 41, the radiocommunication CPU 69 will execute the TCP/IP operation (at step ST8) to separate the IP and TCP headers from the user data, thereby decapsulating the TCP/IP from the user data. The radiocommunication CPU 69 takes the IP address of the WWW server 42 as a source IP address and sends the source IP address and user data (S14) as data from the WWW server 42 to the host device 4.

With the above operations, the radiocommunication device 3 can encapsulate the user data (S12) from the host device 4 and sends the user data (S13) to the WWW server 42, and also decapsulate the user data (S13) sent from the WWW server 42 to the host device 4 and send the decapsulated user data (S14) to the host device 4. The radiocommunication device 3 repeats these operations to make a connection between the host device 4 and Internet network 40.

In addition to the above, in the radiocommunication device 3, user data stored in the external memory module 90 installed in the card slot 53 may be encapsulated for sending to the WWW server 42.

In the radiocommunication system 1 provided with the radiocommunication device 3, the host device 4 can easily be connected to the Internet network 40 by executing the network connection protocols such as TCP, IP and PPP by the use of the network setting information and personal information stored inside the radiocommunication device 3, in place of the host device 4. That is, the host device 4 can be connected to the Internet network 40 without having to store any network setting information and personal information required for connection to the Internet network 40 and having to install therein any information setting function, and network protocols such as the TCP, IP and PPP and mobile communication protocol.

Also, in the radiocommunication system 1, a host device in which network setting information and personal information have been set by another user and a host device of other user, in which no network setting information and personal information have been set, can be connected to the Internet service provider 41 by the user of the network setting information and personal information stored in the radiocommunication device 3.

Furthermore, in the radiocommunication system 1, the host device 4 has only to incorporate a module which is only connected to the radiocommunication device 3 via the BT-based short-range radiocommunication network 10, which leads to a compact design, low power consumption and low costs of the host device 4.

The external memory module 90 installed in the card slot 53 of the above radiocommunication device 3 according to the present invention may be a one designed and manufactured based on the physical specifications and data communication specifications of any of various types of flash memory cards. That is, the external memory module 90 may incorporate a Bluetooth-oriented chip or the like intended for the above operations and designed and manufactured based on the physical and data communication specifications of any of flash memory cards including a Compact Flash (36 mm in length, 42 mm in width and 3.3 mm in thickness) proposed by the SanDisk Corporation (USA), Smart Media (full name: Solid State Floppy Disc Card) (45 mm in length, 37 mm in width and 0.76 mm in thickness) proposed by Toshiba (Japan), Multimedia card (32 mm in length, 24 mm in width and 1.4 mm in thickness) standardized by a company called "Multimediacard Association", and SD Memory Card (32 mm in length, 24 mm in width and 2.1 mm in thickness) developed by the National (Japan), SanDisk Corporation (USA) and Toshiba (Japan).

In the foregoing, the present invention has been described concerning an example in which a radio wave whose frequency is included in the 2.4 GHz band is sent and received inside the short-range radiocommunication network 10 for connection of the host device 4 and public communication network 30 to each other. However, it is of course that the present invention can be applied to connect the host device 4 and Internet network 40 to each other in a wireless LAN in which a radio wave whose frequency is included in a 5 GHz band, as proposed in the IEEE (Institute of Electrical and Electronics Engineers) 802.11a for example.

As having been described in the foregoing, in the communication apparatus according to the present invention, since a relation of connection with an external communication network via the radiocommunication network and communication device is set based on the communication setting information to control first and second radiocommunication means to transfer data between the external communication network and host device, a relation of connection with the external communication network can be internally established independently of any communication setting of the host device to connect the host device to the external communication network such as the Internet network by controlling the first radiocommunication means. Therefore, the communication apparatus according to the present invention permits to set a connection of each of a plurality of host devices and easily make a network setting for connection of the host device to the Internet network or the like, only by changing the internal setting.

In the communication method according to the present invention, communication setting information on an external communication network, internally stored, can be used to set a relation of connection between a communication apparatus and external communication network via a communication apparatus, the relation of connection between the communication apparatus and external communication network can be used to transfer data to and from the external communication network via the communication apparatus, and data can be transferred to and from a host device via a radiocommunication network to control data transfer between the host device and external communication network. So, a relation of connection to the external communication network can be established inside the communication apparatus irrespectively of any communication setting of the host device to connect the host device to the external communication network such as an Internet network or the like. Therefore, the communication method according to the present invention permits to set a connection of each of a plurality of host devices and easily make a network setting for connection of the host device to the Internet network or the like, only by changing the internal setting.

The invention claimed is:

1. A communication apparatus, comprising:
first radiocommunication means for sending data to a host device and receiving data from the host device via a radiocommunication network;
second radiocommunication means for sending data to a communication device and receiving data from the communication device connected to an external communication network separate from the radiocommunication network via the radiocommunication network;
storage means for storing communication setting information on the external communication network, and protocol stacks having at least a first protocol stack and a second protocol stack in which the first protocol stack includes a plurality of protocols and the second protocol stack includes a plurality of protocols; and
communication controlling means for setting a relation of connection to the external communication network via the radiocommunication network and the communication device based on the communication setting information and the protocol stacks stored in the storage means and for controlling the first radiocommunication means and the second radiocommunication means to transfer data between the external communication network and the host device.

2. The apparatus according to claim 1, wherein the storage means stores personal information of a user that operates the host device; and
the communication controlling means uses the communication setting information stored in the storage means and the personal information stored in the storage means to set a relation of connection between the host device and the external communication network.

3. The apparatus according to claim 1, wherein the storage means stores one of PPP (point to point protocol), IP (Internet protocol), and TCP (transport control protocol); and
the communication controlling means uses one of the protocols stored in the storage means to set a connection between the host device and the external communication network and to control the data transfer between the host device and the external communication network.

4. The apparatus according to claim 1, wherein the second radiocommunication means connects via the radiocommunication network to a mobile communication device having a protocol for connecting to a mobile network; and
the communication controlling means sets a relation of connection between the mobile network and the host device via the radiocommunication network.

5. A communication apparatus comprising:
first radiocommunication means for sending data to a host device and receiving data from the host device via a radiocommunication network;
second radiocommunication means for sending data to a communication device and receiving data from the communication device connected to an external communication network separate from the radiocommunication network via the radiocommunication network;
storage means for storing communication setting information on the external communication network; and
communication controlling means for setting a relation of connection to the external communication network via the radiocommunication network and the communication device based on the communication setting information stored in the storage means and for controlling the first radiocommunication means and the second radiocommunication means to transfer data between the external communication network and the host device,
in which the storage means stores a first protocol stack including protocols intended for data transfer to the host device and from the host device, and a second protocol stack including protocols for data transfer to the communication device and from the communication device;
the first radiocommunication means sends data to the host device and receives data from the host device by using the first protocol stack, and the second radiocommunication means sends data to the communication device and receives data from the communication device by using the second protocol stack; and
the communication controlling means sets a relation of connection between the external communication network and the external communication network by using the first and the second protocol stacks.

6. The apparatus according to claim 5,
wherein the second protocol stack stored in the storage means
first protocol stack, and the second radiocommunication means includes protocols for data transfer between the second radiocommunication means and the communication device and protocols for data transfer between the external communication network and the second radiocommunication means via the communication device.

7. A communication method for a communication apparatus that sends data to a host device and receives data from the host device via a radiocommunication network, and that sends data to a communication device and receives data from the communication device connected to external communication network separate from the radiocommunication network via the radiocommunication network, comprising the steps of:
setting a relation of connection with the external communication network via the communication device by using internally stored communication information on the external communication network and protocol stacks having at least a first protocol stack and a second protocol stack in which the first protocol stack includes a plurality of protocols and the second protocol stack includes a plurality of protocols; and sending data to the external communication network and receiving data from the external communication network via the communication device by using the relation of connection with the external communication network while sending data to the host device and receiving data from the host device via the radiocommunication network for controlling the data transfer between the host device and the external communication network.

8. The method according to claim 7, further comprising the step of setting a relation of connection between the host device and the external communication network by using personal information of a user of the host device and communication setting information, the personal information and the communication setting information being stored in the communication apparatus.

9. The method according to claim 7, further comprising the step of setting a connection between the host device and the external communication network by using one of PPP (point to point protocol), IP (Internet protocol), and TCP (transport control protocol) stored in the communication apparatus to control data transfer between the host device and the external communication device.

10. The method according to claim 7, further comprising the step of setting a relation of connection between the mobile network and the host device via the communication device using the relation of connection between the communication device and mobile network set in accordance with a protocol intended for a connection to a mobile network, stored in the communication device.

11. A communication method-for a communication apparatus that sends data to a host device and receives data from the host device via a radiocommunication network, and that sends data to a communication device and receives data from the communication device connected to an external communication network separate from the radiocommunication network via the radiocommunication network, comprising the steps of:

setting a relation of connection with the external communication network via the communication device by using internally stored communication information on the external communication network;

sending data to the external communication network and receiving data from the external communication network via the communication device by using the relation of connection with the external communication network while sending data to the host device and receiving data from the host device via the radiocommunication network for controlling the data transfer between the host device and the external communication network;

holding in the communication device a first protocol stack including protocols intended for data transfer to the host device and from the host device and a second protocol stack including protocols intended for data transfer to the communication device and from the communication device;

sending data to the host device and receiving data from the host device by using the first protocol stack while sending data to the communication device and receiving data from the communication device by using the second protocol stack; and setting a relation of connection between the external communication network and the host device via the radio communication network by using the first and the second protocol stacks.

12. The method according to claim 11, wherein the second protocol stack includes protocols for data transfer between the communication apparatus and the communication device and protocols for data transfer between the external communication network and the communication apparatus.

* * * * *

UNITED STATES PATENT AND TRADEMARK OFFICE
CERTIFICATE OF CORRECTION

PATENT NO. : 7,170,878 B2 Page 1 of 1
APPLICATION NO. : 09/980865
DATED : January 30, 2007
INVENTOR(S) : Kunio Fukuda It is certified that error appears in the above-identified patent and that said Letters Patent is hereby corrected as shown below:

On the title page item (54), the title should read --COMMUNICATION APPARATUS AND METHOD--;

In Column 1, lines 1-2, the title should read --COMMUNICATION APPARATUS AND METHOD--;

In Column 10, line 52, delete "A";

In Column 14, line 63, "fro" should read -- from --;

In Column 18, lines 45-46, delete "first protocol stack, and the second radiocommunication means".

Signed and Sealed this

Eleventh Day of December, 2007

JON W. DUDAS
*Director of the United States Patent and Trademark Office*